United States Patent
She et al.

(10) Patent No.: US 12,263,453 B1
(45) Date of Patent: Apr. 1, 2025

(54) THICKENING DEVICE AND METHOD FOR UNIFORM SOLIDIFICATION OF COMPOSITE LOST CIRCULATION MATERIAL MADE UP OF LIQUID AND GRANULAR LOST CIRCULATION MATERIALS

(71) Applicant: Chengdu University Of Technology, Chengdu (CN)

(72) Inventors: Jiping She, Chengdu (CN); Wenjing Ma, Chengdu (CN); Furong Gong, Chengdu (CN); Yunfei Wang, Chengdu (CN); Gege Teng, Chengdu (CN); Shiyu Zhang, Chengdu (CN); Huimin Li, Chengdu (CN)

(73) Assignee: Chengdu University Of Technology, Chengdu (CN)

( * ) Notice: Subject to any disclaimer, the term of this patent is extended or adjusted under 35 U.S.C. 154(b) by 0 days.

(21) Appl. No.: 18/897,048

(22) Filed: Sep. 26, 2024

(30) Foreign Application Priority Data

Sep. 28, 2023 (CN) .......................... 202311273088.X

(51) Int. Cl.
*B01F 23/00* (2022.01)
*B01F 23/50* (2022.01)
(Continued)

(52) U.S. Cl.
CPC .............. *B01F 23/53* (2022.01); *B01F 23/59* (2022.01); *B01F 27/90* (2022.01); *B01F 29/83* (2022.01);
(Continued)

(58) Field of Classification Search
CPC ........ B01F 35/31; B01F 35/212; B01F 29/83; B01F 35/3214; B01F 35/3231;
(Continued)

(56) References Cited

U.S. PATENT DOCUMENTS 4,380,398 A * 4/1983 Burgess ................... B01F 27/95
366/261
5,762,417 A * 6/1998 Essen .................. B01F 27/1134
366/264
(Continued)

FOREIGN PATENT DOCUMENTS

AU 2013257418 A1 11/2013
CN 101975727 A 2/2011
(Continued)

*Primary Examiner* — Anshu Bhatia
(74) *Attorney, Agent, or Firm* — Bayramoglu Law Offices LLC

(57) ABSTRACT

The provided are a thickening device and method for uniform solidification of composite lost circulation material made up of liquid and granular lost circulation materials. The thickening device includes a base. The base is provided with a side wall; an upper end of the side wall is provided with a detachable top cover; the base, the side wall, and the top cover form a sealed chamber; the base is provided with a rotating support platform; the rotating support platform is provided with a detachable slurry cup; the slurry cup is provided therein with agitating shafts; the agitating shafts each are provided with a blade; a top end of the agitating shaft is connected to a threaded rod through a ball head connector; an upper end of the agitating shaft is provided with a second gear, and the threaded rod is provided with a second limit platform.

13 Claims, 3 Drawing Sheets

(51) Int. Cl.
  *B01F 23/53*    (2022.01)
  *B01F 27/90*    (2022.01)
  *B01F 29/83*    (2022.01)
  *B01F 35/212*   (2022.01)
  *B01F 35/22*    (2022.01)
  *B01F 35/31*    (2022.01)
  *B01F 35/32*    (2022.01)
  *B01F 35/33*    (2022.01)
  *C09K 8/50*     (2006.01)
  *B01F 35/30*    (2022.01)
  *B01F 101/49*   (2022.01)
  *E21B 41/00*    (2006.01)

(52) U.S. Cl.
  CPC ........ *B01F 35/212* (2022.01); *B01F 35/2202* (2022.01); *B01F 35/31* (2022.01); *B01F 35/3214* (2022.01); *B01F 35/3231* (2022.01); *B01F 35/33* (2022.01); *C09K 8/50* (2013.01); *B01F 2035/352* (2022.01); *B01F 2101/49* (2022.01); *B01F 2215/0422* (2013.01); *E21B 41/00* (2013.01)

(58) Field of Classification Search
  CPC ...... B01F 35/33; B01F 23/59; B01F 35/2202; B01F 27/90; B01F 2035/352; B01F 2101/49; B01F 2215/0422; C09K 8/50
  See application file for complete search history.

(56) References Cited

U.S. PATENT DOCUMENTS

2014/0042666 A1* 2/2014 Fradera Pellicer ..... B01F 27/85
                                                        425/207
2016/0193576 A1* 7/2016 Larsen ................... B01F 35/40
                                                        366/331

FOREIGN PATENT DOCUMENTS

| CN | 204649568 U   | 9/2015  |
| CN | 204649569 U   | 9/2015  |
| CN | 109603643 A   | 4/2019  |
| CN | 110346244 A   | 10/2019 |
| CN | 211194458 U   | 8/2020  |
| CN | 212825093 U   | 3/2021  |
| CN | 112710587 A   | 4/2021  |
| CN | 212904631 U   | 4/2021  |
| CN | 113237791 A   | 8/2021  |
| CN | 113281224 A   | 8/2021  |
| CN | 113893743 A   | 1/2022  |
| CN | 115779735 A   | 3/2023  |
| CN | 116008466 A   | 4/2023  |
| EP | 1712890 A2    | 10/2006 |
| JP | H06129975 A   | 5/1994  |
| KR | 20010065206 A | 7/2001  |

* cited by examiner

THICKENING DEVICE AND METHOD FOR UNIFORM SOLIDIFICATION OF COMPOSITE LOST CIRCULATION MATERIAL MADE UP OF LIQUID AND GRANULAR LOST CIRCULATION MATERIALS

CROSS-REFERENCE TO THE RELATED APPLICATIONS

This application is based upon and claims priority to Chinese Patent Application No. 202311273088.X, filed on Sep. 28, 2023, the entire contents of which are incorporated herein by reference.

TECHNICAL FIELD

The present disclosure relates to the field of exploration, and in particular to a thickening device and method for uniform solidification of composite lost circulation material made up of liquid and granular lost circulation materials.

BACKGROUND

Serious lost circulation occurs frequently in drilling and completion engineering. A lost circulation material with good flowability does not rely on fracture width to block fractures of various scales, and can improve sealing pressure-bearing capacity, thereby applying to the lost circulation control of serious lost circulation formations and reservoir intervals. The lost circulation material needs to be prepared on site and introduced into the reservoir through the drill pipe. If the lost circulation material solidifies in the drill pipe, it will block the drill pipe and cause serious losses. If the solidification time of the lost circulation material is too long, it will be difficult to achieve rapid sealing, thereby causing losses. Therefore, in order to achieve precise and effective sealing, it is necessary to conduct thickening tests on the lost circulation material in the laboratory so as to determine the solidification time of the lost circulation material.

The existing thickening device usually uses a slurry agitator. The slurry cup of the slurry agitator is driven by a motor to rotate (the thickening object is placed inside the slurry cup). The agitating rod is inserted into the thickening object and connected to a consistence gauge. During the testing process, the slurry cup drives the thickening object to rotate at a fixed speed (usually 150 rpm). The thickening object applies a corresponding force to the agitating rod, causing the agitating rod to twist instead of rotating 360°. The force exerted on the agitating rod is fed back to the consistence gauge, which increases with the increase of the consistence of the thickening object. Therefore, the consistence of the thickening object can be acquired through the consistence gauge.

However, the existing thickening method requires the thickening test to be conducted at a constant speed. If a high speed is used, the thickening object will exert a significant force on the agitating rod before it reaches the target state, exceeding the range of the consistence gauge. When the slurry cup rotates at a regular speed, the thickening object is relatively thin in its initial state. Therefore, the initial speed of the thickening object is very low, so solid particles in the thickening object precipitate, resulting in uneven thickening in the end. In addition, the agitating rod of the existing thickening device cannot rotate on its own, and there is a speed difference between the agitating rod and the wall of the slurry cup, resulting in jamming. In severe cases, it will cause the reading of the consistence gauge to rise rapidly or the motor resistance to increase, thereby triggering power-off protection and affecting the thickening process.

In summary, the existing thickening device is unable to achieve uniform thickening and is prone to getting solid particles stuck, thereby affecting the thickening process.

SUMMARY

In view of the above shortcomings in the prior art, the present disclosure provides a thickening device and method for uniform solidification of composite lost circulation material made up of liquid and granular lost circulation materials. The present disclosure solves the problem that the existing thickening device is unable to achieve uniform thickening and is prone to getting solid particles stuck, thereby affecting the thickening process.

To achieve the above objective, the present disclosure adopts the following technical solutions:

The thickening device for uniform solidification of composite lost circulation material made up of liquid and granular lost circulation materials includes a base, where the base is provided with a side wall; an upper end of the side wall is provided with a detachable top cover; and the base, the side wall, and the top cover form a sealed chamber;

the base is provided with a rotating support platform; the rotating support platform is provided with a detachable slurry cup; the slurry cup is provided therein with agitating shafts; the agitating shafts each are provided with a blade; a top end of the agitating shaft is connected to a threaded rod through a ball head connector, allowing the agitating shaft to rotate relative to the threaded rod; an upper end of the agitating shaft is provided with a second gear; the threaded rod is provided with a second limit platform; and the slurry cup includes an inner surface provided with an inner gear ring for driving the second gear and an outer surface provided with an outer gear ring;

the ball head connector includes a connecting component and a limiting component; and the connecting component is a cylinder, such that the threaded rod and the agitating shaft are on a same axis;

the side wall is provided with a first limit platform, a feed inlet, and a discharge outlet; the first limit platform is detachably connected to a horizontal plate located above the slurry cup; the horizontal plate is provided with slots for front ends of the threaded rods to pass through and slide; the front end of the threaded rod is fastened to the horizontal plate by a nut; the horizontal plate is further provided with a material addition window; and a width of the slot is smaller than a diameter of the second limit platform; and a lower surface of the top cover is provided with a motor; and a rotating shaft of the motor is provided with a first gear that matches the outer gear ring.

Further, there are at least three stabilizer bars arranged at an inner side of the side wall; a front end of each of the stabilizer bars is provided with a first roller; and an included angle between each two adjacent stabilizer bars is 360°/n, n being a total number of the stabilizer bars.

Further, there are three slots and three agitating shafts; each two adjacent slots have an included angle of 120°; and each two adjacent agitating shafts have an included angle of 120°.

Further, the horizontal plate is provided with a first mounting hole, and a bolt is passed through the first mounting hole to detachably fix the horizontal plate to the first limit platform.

Further, when the horizontal plate is fixed to the first limit platform, the slots span a wall of the slurry cup, and the material addition window is located directly above the slurry cup.

Further, the limiting component includes two hemispheres; the two hemispheres are provided with second mounting holes; a bolt is passed through the second mounting holes to fasten the two hemispheres; and the two hemispheres fastened together form a space inside for accommodating the cylinder.

Further, the second gear includes a bearing; the bearing includes an inner ring and an outer ring; the inner ring of the bearing is fitted onto the agitating shaft and provided with an L-shaped bracket; a lower side of a front end of the L-shaped bracket is provided with a telescopic cylinder; the telescopic cylinder is fitted into a spring; a lower surface of the telescopic cylinder is provided with a second roller; a circumferential surface of the outer ring of the bearing forms a gear surface that matches the inner gear ring; and an upper surface of the outer ring of the bearing is provided with a V-shaped groove for accommodating the second roller.

The thickening method is based on the thickening device for uniform solidification of composite lost circulation material made up of liquid and granular lost circulation materials and includes the following steps:

S1: placing the slurry cup on the rotating support platform; connecting, through the ball head connector, the threaded rod to the agitating shaft; passing the threaded rod through the horizontal plate; and pre-fixing, by the nut, the threaded rod to the horizontal plate;

S2: fixing the horizontal plate to the first limit platform; adjusting a position of the threaded rod to match the second gear with the inner gear ring; and tightening the nut to secure the threaded rod to the horizontal plate;

S3: adding, through the material addition window, a target thickening material into the slurry cup;

S4: securing the top cover to the side wall to match the first gear with the outer gear ring;

S5: filling, according to a pressurization requirement, the sealed chamber with pressurized oil through the feed inlet, and applying a corresponding oil pressure or air pressure;

S6: starting the motor to drive the slurry cup to rotate according to a set speed, and acquiring a real-time torque feedback from the motor; and S7: acquiring a consistence of the target thickening material based on the torque feedback from the motor.

Further, before the slurry cup is placed on the rotating support platform, there are at least three stabilizer bars arranged at the inner side of the side wall; and an included angle of 360°/n is formed between each two adjacent stabilizer bars to provide anti-shake support for the slurry cup, n being the total number of the stabilizer bars.

The present disclosure has the following beneficial effects:

1. In the present disclosure, the slurry cup drives the agitating shaft to rotate, causing the blade on the agitating shaft to rotate accordingly. Thus, solid particles between the blade and the wall of the slurry cup are carried out, thereby avoiding the solid particles from getting stuck between the blade and the slurry cup. The present disclosure solves the problem of solid particles affecting the thickening process.

2. In the present disclosure, the slurry cup drives the agitating shaft to rotate, and the blade also participates in the agitation of the thickening object. By increasing the moving speed of the thickening object while keeping the speed of the slurry cup constant, the uniformity of the thickening object is improved, effectively avoiding solid particle precipitation.

3. In the present disclosure, the connecting component of the thickening object ball head connector is a cylinder, such that the threaded rod and the agitating shaft are on the same axis. In this way, when the agitating shaft rotates axially relative to the threaded rod, the second gear will not detach from the inner gear ring, and the stability of the blade is maintained, avoiding blade shaking or collision with the slurry cup.

4. The slot allows the front end of the threaded rod to pass through and slide, allowing the threaded rod to pass through and move horizontally at an inner side of the slot, facilitating the adjustment of the meshing between the second gear and the inner gear ring.

5. The stabilizer bar is used to limit the horizontal position of the slurry cup, and the first roller can slide on the surface of the slurry cup, providing anti-shake support for the slurry cup without affecting its rotation.

6. When the horizontal plate is fixed to the first limit platform, the slot spans the side wall of the slurry cup, making it easy to observe the meshing between the second gear and the inner gear ring, ensuring the agitating effect of the blade on the thickening object.

7. The limiting component is divided into two hemispheres, which can be quickly disassembled and assembled, making it easy to disassemble and clean the agitating shaft and the blade.

8. In the present disclosure, the consistence of the target thickening material is acquired based on the torque feedback from the motor. Compared to the method using a mechanical consistence gauge, the present disclosure improves sensitivity and enables quick data acquisition.

9. In the present disclosure, the second gear is a split type, and the L-shaped bracket, the telescopic cylinder, the spring, and the V-shaped groove form a force limiter. When the resistance to the rotation of the agitator composed of the agitating shaft and the blade reaches a certain value, the lower end of the telescopic cylinder is squeezed out of the V-shaped groove, thereby disconnecting the slurry cup and the agitating shaft. In this way, after the target thickening material is thickened to a certain degree, the agitator will not be damaged due to increased resistance, and the agitator will not damage the thickened material.

Figure 1:
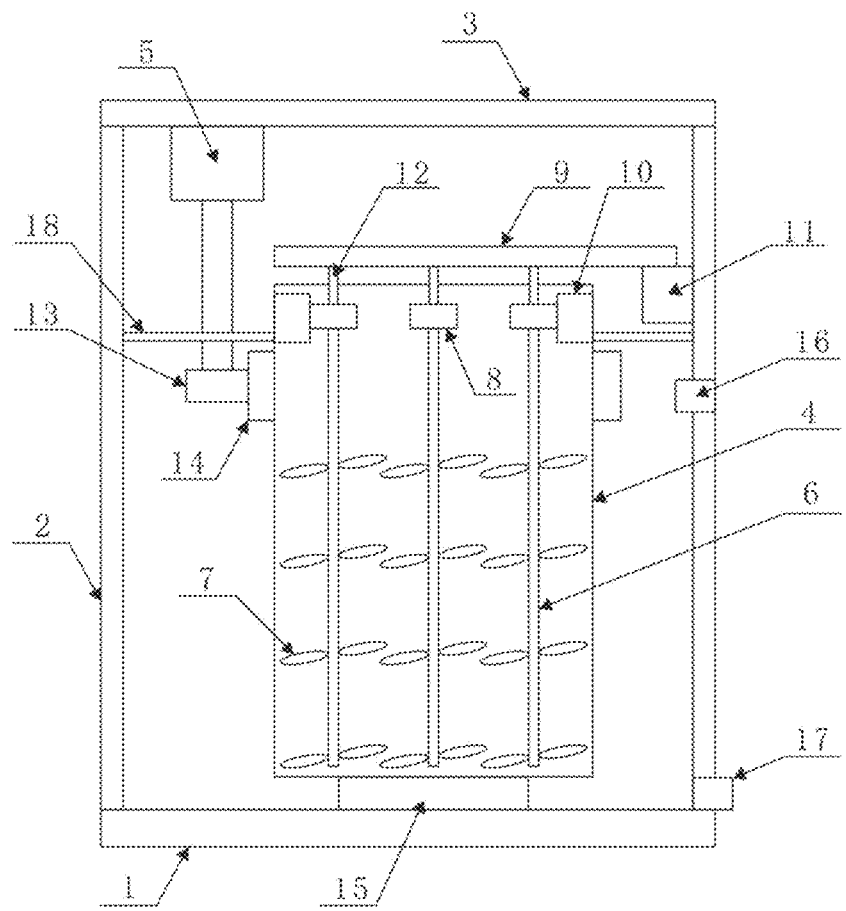
FIG. 1 is a structural diagram of a thickening device according to the present disclosure.

Reference Numerals: 1. base; 2. side wall; 3. top cover; 4. slurry cup; 5. motor; 6. agitating shaft; 7. blade; 8. second gear; 9. horizontal plate; 10. inner gear ring; 11. first limit platform; 12. threaded rod; 13. first gear; 14. outer gear ring; 15. rotating support platform; 16. feed inlet; 17. discharge outlet; 18. stabilizer bar; 19. slot; 20. nut; 21. first mounting hole; 22. second limit platform; 23. ball head connector; 24. first roller; 25. cylinder; 26. hemisphere; 27. second mounting hole; 28. material addition window; 29. outer ring; 30. inner ring; 31. V-shaped groove; 32. L-shaped bracket; 33. telescopic cylinder; 34. spring; and 35. second roller.

DETAILED DESCRIPTION OF THE EMBODIMENTS

The specific embodiment of the present disclosure will be described below so that those skilled in the art can understand the present disclosure, but it should be clear that the present disclosure is not limited to the scope of the specific embodiment. For those of ordinary skill in the art, as long as various changes fall within the spirit and scope of the present disclosure defined and determined by the appended claims, these changes are apparent, and all inventions and creations using the concept of the present disclosure are protected.

Figure 2:
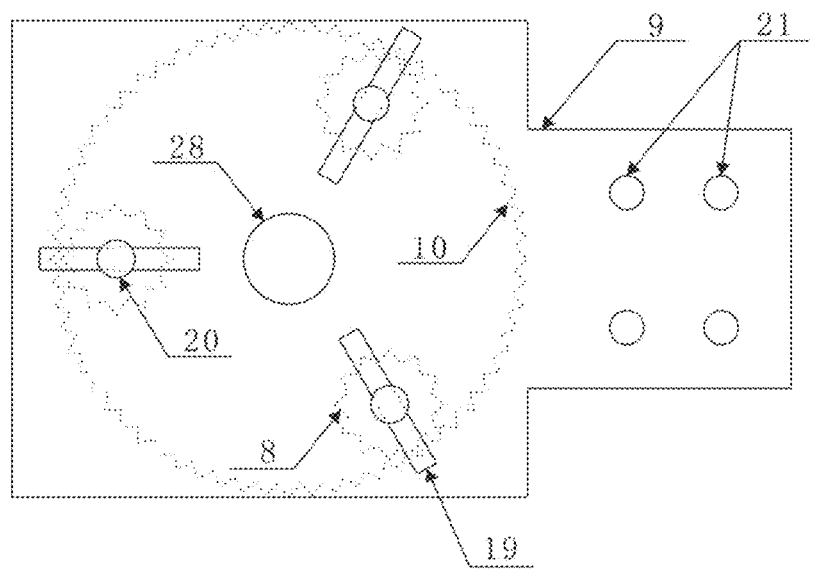
FIG. 2 is a top view of a top cover.
Figure 3:
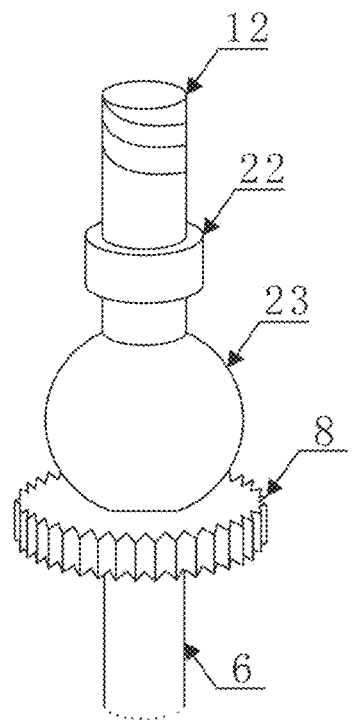
FIG. 3 is a schematic diagram of a threaded rod that is connected to an agitating shaft through a ball head connector.

As shown in FIGS. 1, 2, and 3, a thickening device for uniform solidification of composite lost circulation material made up of liquid and granular lost circulation materials includes base 1. The base 1 is provided with side wall 2. An upper end of the side wall 2 is provided with detachable top cover 3. The base 1, the side wall 2, and the top cover 3 form a sealed chamber.

The base 1 is provided with rotating support platform 15. The rotating support platform 15 is provided with detachable slurry cup 4. The slurry cup 4 is provided therein with agitating shafts 6. The agitating shafts 6 each are provided with blade 7. A top end of the agitating shaft 6 is connected to threaded rod 12 through ball head connector 23, allowing the agitating shaft 6 to rotate relative to the threaded rod 12. An upper end of the agitating shaft 6 is provided with second gear 8. The threaded rod 12 is provided with second limit platform 22. An inner surface of the slurry cup 4 is provided with inner gear ring 10 for driving the second gear 8. An outer surface of the slurry cup 4 is provided with outer gear ring 14.

Figure 5:
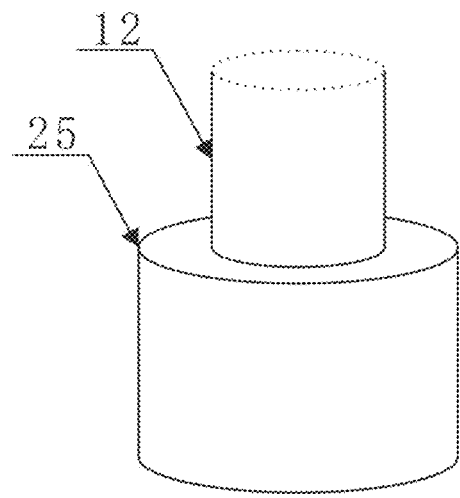
FIG. 5 is a structural diagram of a cylinder.

The ball head connector 23 includes a connecting component and a limiting component. As shown in FIG. 5, the connecting component is cylinder 25, such that the threaded rod 12 and the agitating shaft 6 are on a same axis.

The side wall 2 is provided with first limit platform 11, feed inlet 16, and discharge outlet 17. The first limit platform 11 is detachably connected to horizontal plate 9 located above the slurry cup 4. The horizontal plate 9 is provided with slots 19 for front ends of the threaded rods 12 to pass through and slide. The front end of the threaded rod 12 is fastened to horizontal plate 9 by nut 20. The horizontal plate 9 is further provided with material addition window 28. A width of the slot 19 is smaller than a diameter of the second limit platform 22.

A lower surface of the top cover 3 is provided with motor 5. A rotating shaft of the motor 5 is provided with first gear 13 that matches the outer gear ring 14.

Figure 4:
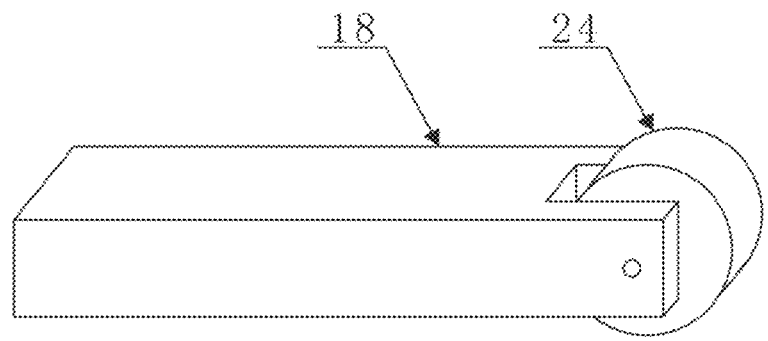
FIG. 4 is a structural diagram of a stabilizer bar.

There are at least three stabilizer bars 18 arranged at an inner side of the side wall 2. As shown in FIG. 4, a front end of each of the stabilizer bars 18 is provided with first roller 24. An included angle between each two adjacent stabilizer bars 18 is 360°/n, n being a total number of the stabilizer bars 18.

There are three slots 19 and three agitating shafts 6. Each two adjacent slots 19 have an included angle of 120°, and each two adjacent agitating shafts 6 have an included angle of 120°.

The horizontal plate 9 is provided with first mounting hole 21, and a bolt is passed through the first mounting hole 21 to detachably fix the horizontal plate 9 to the first limit platform 11.

When the horizontal plate 9 is fixed to the first limit platform 11, the slots 19 span a wall of the slurry cup 4, and the material addition window 28 is located directly above the slurry cup 4.

Figure 6:
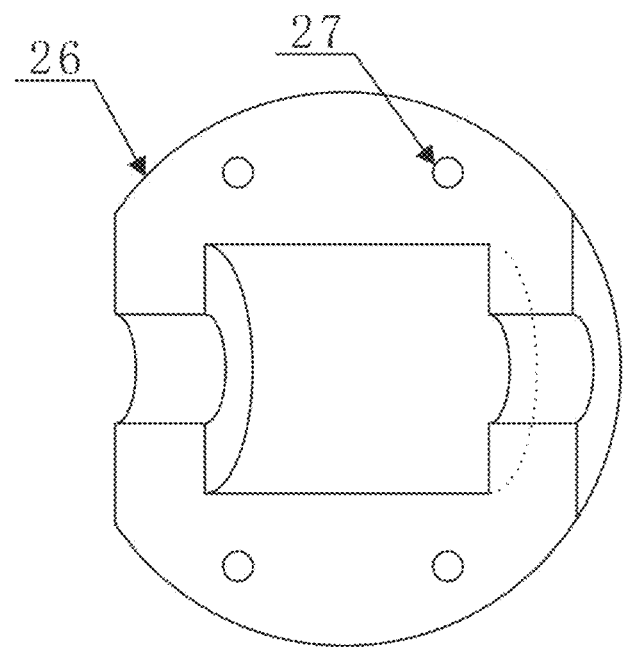
FIG. 6 is a structural diagram of a hemisphere.

The limiting component includes two hemispheres 26. As shown in FIG. 6, the two hemispheres 26 are provided with second mounting holes 27, and a bolt is passed through the second mounting holes 27 to fasten the two hemispheres 26. The two hemispheres 26 fastened together form a space inside for accommodating the cylinder 25.

A thickening method based on the thickening device for uniform solidification of composite lost circulation material made up of liquid and granular lost circulation materials includes the following steps.

S1. The slurry cup 4 is placed on the rotating support platform 15. The threaded rod 12 and the agitating shaft 6 are connected through the ball head connector 23. The threaded rod 12 passes through the horizontal plate 9. The nut 20 pre-fixes the threaded rod 12 to the horizontal plate 9.

S2. The horizontal plate 9 is fixed to the first limit platform 11. A position of the threaded rod 12 is adjusted to match the second gear 8 with the inner gear ring 10. The nut 20 is tightened to secure the threaded rod 12 to the horizontal plate 9.

S3. A target thickening material is added into the slurry cup 4 through the material addition window 28.

S4. The top cover 3 is secured to the side wall 2 to match the first gear 13 with the outer gear ring 14.

S5. According to a pressurization requirement, the sealed chamber is filled with pressurized oil through the feed inlet 16, and a corresponding oil pressure or air pressure is applied.

S6. The motor 5 is started to drive the slurry cup 4 to rotate according to a set speed, and a real-time torque feedback is acquired from the motor 5.

S7. A consistence of the target thickening material is acquired based on the torque feedback from the motor 5.

In an embodiment of the present disclosure, before the slurry cup 4 is placed on the rotating support platform 15, there are at least three stabilizer bars 18 arranged at the inner side of the side wall 2. An angle of 360°/n is formed between each two adjacent stabilizer bars 18 to provide anti-shake support for the slurry cup 4, n being the total number of the stabilizer bars 18.

In an embodiment of the present disclosure, to simulate the target thickening material at an underground temperature, it is only necessary to add a same heating unit as in the existing thickening device.

Figure 7:
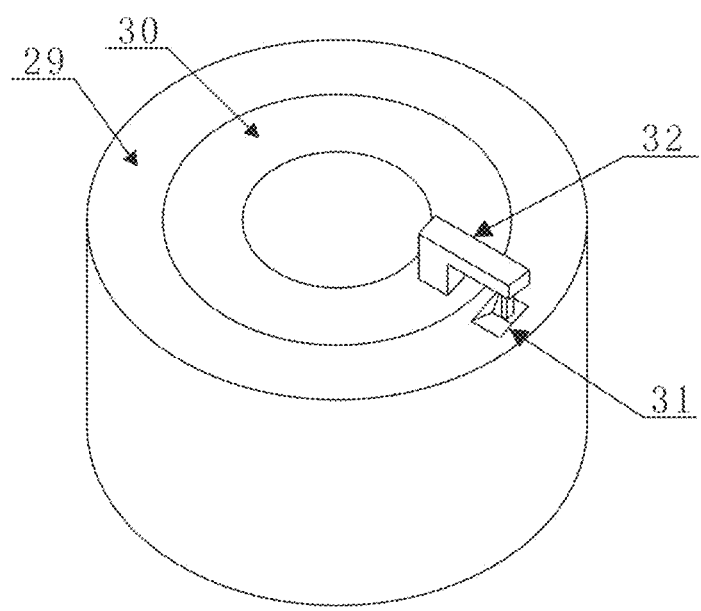
FIG. 7 is a partial structural diagram of a bearing.
Figure 8:
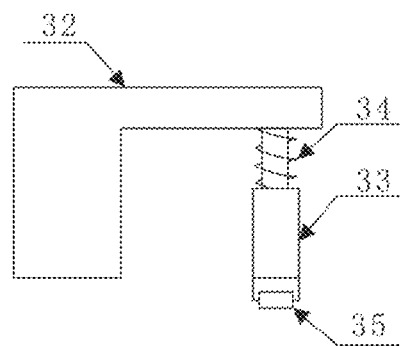
FIG. 8 is a partial structural diagram of a force limiter.

In an embodiment of the present disclosure, the consistence of the target thickening material increases over time. When the target thickening material is thickened to a certain degree, there will be no solid particle settling, and the resistance of the target thickening material to the agitator composed of the agitating shaft 6 and the blade 7 increases. At this point, if the agitator is still rotated by the slurry cup 4, the blade 7 may be damaged and there may be a negative impact on the thickening process. Therefore, as shown in FIGS. 7 and 8, in this embodiment, the second gear 8 includes a bearing. The bearing includes inner ring 30 and outer ring 29. The inner ring 30 of the bearing is fitted onto the agitating shaft 6. The inner ring 30 of the bearing is provided with L-shaped bracket 32. A lower side of a front end of the L-shaped bracket 32 is provided with telescopic cylinder 33. The telescopic cylinder 33 is fitted into spring 34. A lower surface of the telescopic cylinder 33 is provided with second roller 35. A circumferential surface of the outer ring 29 of the bearing forms a gear surface that matches the inner gear ring 10. An upper surface of the outer ring 29 of the bearing is provided with V-shaped groove 31 for accommodating the second roller 35.

In this embodiment, the spring 34 is located between the L-shaped bracket 32 and the telescopic cylinder 33, giving the telescopic cylinder 33 a downward thrust to push the second roller 35 into the V-shaped groove 31. A greater elastic force of the spring 34 indicates a greater force required for the second roller 35 to detach from the V-shaped groove 31. When the resistance experienced by the agitating shaft 6 is greater than or equal to the force required for the second roller 35 to detach from the V-shaped groove 31, the second roller 35 moves relative to the V-shaped groove 31, thereby compressing the spring 34. When the second roller 35 completely leaves the V-shaped groove 31, the second roller 35 rolls on the upper surface of the outer ring 29 of the bearing (mainly the outer ring 29 rotates around the agitating shaft 6). At this time, the outer ring 29 and the inner ring 30 of the bearing move relative to each other. The slurry cup 4 no longer drives the agitating shaft 6 to rotate through the second gear 8. The speed of the blade 7 relative to the target thickening material is reduced to avoid damage to the blade 7 and to prevent the blade 7 from disrupting the thickening process of the target thickening material due to continuous rotation. Similarly, when the resistance experienced by the agitating shaft 6 is less than the force required for the second roller 35 to detach from the V-shaped groove 31, the outer ring 29 and the inner ring 30 of the bearing are almost stationary and rotate simultaneously. The slurry cup 4 drives the agitating shaft 6 to rotate through the second gear 8.

Therefore, in this embodiment, the L-shaped bracket, the telescopic cylinder, the spring, and the V-shaped groove form a force limiter. By adjusting the elastic force of the spring 34, the timing of relative rotation between the outer ring 29 and the inner ring 30 in the second gear 8 can be adjusted, that is, the timing when the blade 7 no longer agitates the target thickening material can be adjusted. When the blade 7 no longer agitates the target thickening material, this thickening device is similar to a traditional thickening device in that it only rotates the target thickening material through the slurry cup 4 and the blade 7 only bears the torque formed by the rotation of the target thickening material.

In an embodiment of the present disclosure, to calibrate the thickening device, the thickening device is used to thicken a thickening material for a known thickening time. The thickening is performed at different times. The current thickening state is denoted as a, corresponding to a thickening time of t. After thickening for different times, the consistence of the thickening material is measured based on an existing standard to acquire corresponding thickening state b. The time interval between the two thickening means is calculated, and a thickening state change value x of the thickening material is acquired based on the known thickening time during the time interval. The specific value of a is calculated according to $a=b-x$. In this way, multiple thickening processes are performed, multiple sets of thickening state a and thickening time t are acquired. By numerical fitting, the thickening states of the corresponding thickening material using this thickening device at different thickening times are acquired. By comparing the thickening states of the corresponding thickening material using this thickening device at different thickening times with the thickening states of the thickening material under the existing standard at different thickening times, a calibration value between this thickening device and the existing standard is acquired.

In an embodiment of the present disclosure, a curved edge blade with a height difference can be selected as the blade 7. On the one hand, the height difference can achieve effective agitation of the bottom slurry. On the other hand, the curved edge blade structure can reduce contact with the slurry cup 4, reducing the possibility of solid particles entering the position between the blade 7 and the wall of the slurry cup 4.

In an embodiment of the present disclosure, when the torque feedback from the motor 5 reaches a certain value, it is determined that the target thickening material reaches a corresponding thickening state. At this point, the motor 5 is turned off, the pressure is removed, and the oil is released. After the temperature drops, the top cover 3 is opened, and the motor 5 is taken out. If the agitating shaft 6 can move laterally in the target thickening material, the nut 20 is first loosened, and the threaded rod 12 is moved laterally in the slot 19 to disengage the second gear 8 from the inner gear ring 10. Then, the horizontal plate 9 is removed, the horizontal plate 9 and the agitating shaft 6 are taken out as a whole, and the nut 20 is completely removed. If the agitating shaft 6 cannot move laterally in the target thickening material, the nut 20 is completely removed, the horizontal plate 9 is removed, and finally the slurry cup 4 and the agitating shaft 6 are taken out.

In an embodiment of the present disclosure, the inner gear ring 10 is higher than an upper surface of the target thickening material to avoid the target thickening material affecting the meshing between the second gear 8 and the inner gear ring 10.

In an embodiment of the present disclosure, the nut 20 is loosened, that is, a distance between the nut 20 and the second limit platform 22 is greater than a thickness of the horizontal plate 9, and the nut 20 is still on the threaded rod 12. The threaded rod 12 is fastened to the horizontal plate 9, that is, the horizontal plate 9 is clamped between the nut 20 and the second limit platform 22, and the relative positions of the threaded rod 12 and the horizontal plate 9 are fixed.

In summary, the present disclosure solves the problem that the existing thickening device is unable to achieve uniform thickening and is prone to getting solid particles stuck, thereby affecting the thickening process.

What is claimed is:

1. A thickening device for uniform solidification of composite lost circulation material made up of liquid and granular lost circulation materials, comprising a base, wherein the base is provided with a side wall; an upper end of the side wall is provided with a detachable top cover; and the base, the side wall, and the top cover form a sealed chamber;

the base is provided with a rotating support platform; the rotating support platform is provided with a detachable slurry cup; the slurry cup is provided therein with agitating shafts; the agitating shafts each are provided with a blade; a top end of the agitating shaft is connected to a threaded rod through a ball head connector, allowing the agitating shaft to rotate relative to the threaded rod; an upper end of the agitating shaft is provided with a second gear; the threaded rod is provided with a second limit platform; and the slurry cup comprises an inner surface provided with an inner gear ring for driving the second gear and an outer surface provided with an outer gear ring;

the ball head connector comprises a connecting component and a limiting component; and the connecting component is a cylinder, wherein the threaded rod and the agitating shaft are on a same axis;

the side wall is provided with a first limit platform, a feed inlet, and a discharge outlet; the first limit platform is detachably connected to a horizontal plate located above the slurry cup; the horizontal plate is provided with slots for front ends of the threaded rods to pass through and slide; the front end of the threaded rod is fastened to the horizontal plate by a nut; the horizontal plate is further provided with a material addition window; and a width of the slot is smaller than a diameter of the second limit platform; and a lower surface of the top cover is provided with a motor; and a rotating shaft of the motor is provided with a first gear, wherein the first gear matches the outer gear ring;

wherein the second gear comprises a bearing; the bearing comprises an inner ring and an outer ring; the inner ring of the bearing is fitted onto the agitating shaft and provided with an L-shaped bracket; a lower side of a front end of the L-shaped bracket is provided with a telescopic cylinder; the telescopic cylinder is fitted into a spring; a lower surface of the telescopic cylinder is provided with a second roller; a circumferential surface of the outer ring of the bearing forms a gear surface, wherein the gear surface matches the inner gear ring; and an upper surface of the outer ring of the bearing is provided with a V-shaped groove for accommodating the second roller.

2. The thickening device for the uniform solidification of the composite lost circulation material made up of liquid and granular lost circulation materials according to claim 1, wherein there are at least three stabilizer bars arranged at an inner side of the side wall; a front end of each of the at least three stabilizer bars is provided with a first roller; and an included angle between each two adjacent stabilizer bars is 360°/n, n being a total number of the at least three stabilizer bars.

3. The thickening device for the uniform solidification of the composite lost circulation material made up of liquid and granular lost circulation materials according to claim 1, wherein there are three slots and three agitating shafts; each two adjacent slots have an included angle of 120°; and each two adjacent agitating shafts have an included angle of 120°.

4. The thickening device for the uniform solidification of the composite lost circulation material made up of liquid and granular lost circulation materials according to claim 1, wherein the horizontal plate is provided with a first mounting hole, and a bolt is passed through the first mounting hole to detachably fix the horizontal plate to the first limit platform.

5. The thickening device for the uniform solidification of the composite lost circulation material made up of liquid and granular lost circulation materials according to claim 1, wherein when the horizontal plate is fixed to the first limit platform, the slots span a wall of the slurry cup, and the material addition window is located directly above the slurry cup.

6. The thickening device for the uniform solidification of the composite lost circulation material made up of liquid and granular lost circulation materials according to claim 1, wherein the limiting component comprises two hemispheres; the two hemispheres are provided with second mounting holes; a bolt is passed through the second mounting holes to fasten the two hemispheres; and the two hemispheres fastened together form a space inside for accommodating the cylinder.

7. A thickening method based on the thickening device for the uniform solidification of the composite lost circulation material made up of liquid and granular lost circulation materials according to claim 1, comprising the following steps:
S1: placing the slurry cup on the rotating support platform; connecting, through the ball head connector, the threaded rod to the agitating shaft; passing the threaded rod through the horizontal plate; and pre-fixing, by the nut, the threaded rod to the horizontal plate;
S2: fixing the horizontal plate to the first limit platform; adjusting a position of the threaded rod to match the second gear with the inner gear ring; and tightening the nut to secure the threaded rod to the horizontal plate;
S3: adding, through the material addition window, a target thickening material into the slurry cup;
S4: securing the top cover to the side wall to match the first gear with the outer gear ring;
S5: filling, according to a pressurization requirement, the sealed chamber with pressurized oil through the feed inlet, and applying a corresponding oil pressure or air pressure;
S6: starting the motor to drive the slurry cup to rotate according to a set speed, and acquiring a real-time torque feedback from the motor; and
S7: acquiring a consistence of the target thickening material based on the torque feedback from the motor.

8. The thickening method according to claim 7, wherein before the slurry cup is placed on the rotating support platform, there are at least three stabilizer bars arranged at an inner side of the side wall; and an included angle of 360°/n is formed between each two adjacent stabilizer bars to provide anti-shake support for the slurry cup, n being a total number of the at least three stabilizer bars.

9. The thickening method according to claim 7, wherein in the thickening device, there are at least three stabilizer bars arranged at an inner side of the side wall; a front end of each of the at least three stabilizer bars is provided with a first roller; and an included angle between each two adjacent stabilizer bars is 360°/n, n being a total number of the at least three stabilizer bars.

10. The thickening method according to claim 7, wherein in the thickening device, there are three slots and three agitating shafts; each two adjacent slots have an included angle of 120°; and each two adjacent agitating shafts have an included angle of 120°.

11. The thickening method according to claim 7, wherein in the thickening device, the horizontal plate is provided with a first mounting hole, and a bolt is passed through the first mounting hole to detachably fix the horizontal plate to the first limit platform.

12. The thickening method according to claim 7, wherein in the thickening device, when the horizontal plate is fixed to the first limit platform, the slots span a wall of the slurry cup, and the material addition window is located directly above the slurry cup.

13. The thickening method according to claim 7, wherein in the thickening device, the limiting component comprises two hemispheres; the two hemispheres are provided with second mounting holes; a bolt is passed through the second mounting holes to fasten the two hemispheres; and the two hemispheres fastened together form a space inside for accommodating the cylinder.

\* \* \* \* \*